US012728347B2

(12) United States Patent
Armstrong et al.

(10) Patent No.: US 12,728,347 B2
(45) Date of Patent: Sep. 8, 2026

(54) HAPTIC MODULE AND CONTROLLER HAVING ROTATIONAL WEIGHT DISTRIBUTION

(71) Applicant: Sony Interactive Entertainment Europe Limited, London (GB)

(72) Inventors: Calum Armstrong, London (GB); Oliver Hume, London (GB); Nima Karshenas, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 274 days.

(21) Appl. No.: 18/237,474

(22) Filed: Aug. 24, 2023

(65) Prior Publication Data

US 2024/0066395 A1 Feb. 29, 2024

(30) Foreign Application Priority Data

Aug. 31, 2022 (GB) ...................................... 2212621

(51) Int. Cl.
*A63F 13/285* (2014.01)
*A63F 13/211* (2014.01)
*G06F 3/01* (2006.01)

(52) U.S. Cl.
CPC .......... *A63F 13/285* (2014.09); *A63F 13/211* (2014.09); *G06F 3/016* (2013.01); *A63F 2300/1037* (2013.01)

(58) Field of Classification Search
CPC .................. A63F 13/285; A63F 13/211; A63F 2300/1037; A63F 13/24; G06F 3/016; G06F 3/0346
See application file for complete search history.

(56) References Cited

U.S. PATENT DOCUMENTS

2005/0085299 A1* 4/2005 Murzanski ............ A63F 13/214 463/38
2006/0281550 A1 12/2006 Schena
2009/0325699 A1 12/2009 Delgiannidis
2011/0309919 A1 12/2011 Tidemand et al.
2016/0175702 A1* 6/2016 Black .................... G06T 19/006 463/31

FOREIGN PATENT DOCUMENTS

WO 2021/102291 A1 5/2021

OTHER PUBLICATIONS

Extended European Search Report including Written Opinion for Application No. 23194303.6 dated Jan. 24, 2024, pp. 1-10.
Shigeyama, J. et al., "Transcalibur a Weight Shifting Virtual Reality Controller for 2D Shape Rendering based on Computational Perception Model", Human Factors in Computing Systems, ACM, 2 Penn Plaza, Suite 701 New York NY 10121-0701 USA, May 2, 2019 (May 2, 2019), pp. 1-11, XP058574755.

* cited by examiner

*Primary Examiner* — Peter J Iannuzzi
(74) *Attorney, Agent, or Firm* — Fish & Richardson P.C.

(57) ABSTRACT

A controller for a multimedia entertainment system is provided. The controller comprises a weighted component connected to the controller, wherein the weighted component is rotationally movable relative to the controller. The controller is configured to rotate the weighted component from a start position to an end position to shift the centre of mass of the controller in response to a trigger event; wherein the weighted component stops moving at the end position. This movement of the weighted component provides directional haptic feedback to a user of the controller.

22 Claims, 5 Drawing Sheets

HAPTIC MODULE AND CONTROLLER HAVING ROTATIONAL WEIGHT DISTRIBUTION

CROSS-REFERENCE TO RELATED APPLICATIONS

The present application claims priority from United Kingdom Patent Application No. 2212621.3, filed Aug. 31, 2022, the disclosure of which is hereby incorporated herein by reference.

BACKGROUND

A controller for a multimedia entertainment system is an input device that enables a user to provide input to the system. For example, the multimedia entertainment system may be a video game console and the controller enables a user to interact with a video game application running on the console.

The controller can also be an output device and provide feedback to the user in response to their operation of the controller and/or an event occurring on an application running on the multimedia entertainment system. The controller feedback can be provided in a variety of manners, such as audio feedback output from a speaker of the controller or haptic feedback output by a haptic module of the controller. Providing this controller feedback can substantially improve the experience of using the controller, for examples by deepening the immersion a user experiences, or by increasing the accessibility of the controller or an application being controlled.

Currently, haptic modules in controllers and other peripherals largely consist of vibration motors often coupled to small masses which oscillate at high frequencies to produce a "rumble" vibration that can be felt by the user. The range of frequencies that these vibration motors can operate at efficiently limits their use to producing these small "rumble" effects and the level of controller feedback they can provide.

Developing effective haptic feedback for a controller is challenging and, just as effective feedback can positively impact the experience of using a controller, ineffective feedback can distract a user and significantly detract from their experience. The present invention provides new forms of haptic feedback by significantly altering the weight distribution of the haptic module.

SUMMARY OF INVENTION

It is an object of the present invention to provide a haptic module for a controller for a multimedia entertainment system which makes progress in solving some of prior art devices discussed above.

According to a first aspect of the invention, there is provided a controller for a multimedia entertainment system, the controller comprising: a weighted component connected to the controller, wherein the weighted component is rotationally movable relative to the controller; and wherein the controller is configured to rotate the weighted component from a start position to an end position to shift the centre of mass of the controller in response to a trigger event. Typically, the weighted component stops moving at the end position.

The position of the weighted component significantly affects the position of the centre of mass of the controller, therefore adjusting the position of the weighted component allows the controller to provide directional haptic feedback to a user. Rotating the weighted component means a wide variety of different types of directional haptic feedback can be provided, such as leaning sensation when the weight distribution of the controller is adjusted to make the controller heavier on one side for an extended period of time, or a jerking sensation when the weighted component is rapidly decelerated to provide a directional impact effect on the controller. This directional haptic feedback is not achievable with existing controllers using known haptic modules, as the weight and overall feel of a controller remains central even when these haptic modules are actuated.

The trigger event may be a virtual event such as an event that occurs in an application running on the multimedia entertainment system, or the trigger event can be a real event such as an input element of the controller being actuated. The weighted component is rotated in response to the trigger event to enhance the impact of the event and the user's experience using the controller and controlling the system. Examples of virtual events in a video game application running on the multimedia entertainment system include a character walking or jumping, a car turning, a bat swinging etc. Other examples of real events include an input element of the controller being actuated, or the controller moving (including rotation and/or translation of the controller).

Optionally, the start position is different to the end position. In this way, the weight distribution of the controller is adjusted at least until the next trigger event. This can produce a leaning sensation when the centre of mass of the controller is moved out of alignment with the vertical axis of gravity and so there is a resultant torque due to gravity acting on the controller. As used herein, gravity and the vertical axis of gravity typically refer to the gravity direction at the point of the controller.

Optionally, the controller is configured to rotate the weighted component between 0 and 360 degrees relative to an axis of the controller in response to the trigger event.

The range of between 0 and 360 degrees refers to the movement of the weighted component in response to the trigger event, rather than the angular displacement between the start position and the end position. That is, the maximum range of angles the weighted component may rotate through in response to a single trigger event is 360 degrees. This ensures the weighted component provides directional haptic feedback on the controller, rather than repeatedly oscillating the weighted component in response to a single trigger event and causing the controller to vibrate. This saves energy and avoids movement of the weighted component negatively impacting the user experience.

Optionally, the controller is configured to rotate the weighted component between 0 and 180 degrees relative to an axis of the controller in response to the trigger event.

As discussed above, the range of between 0 and 180 degrees refers to movement of the weighted component in response to the trigger event, rather than the angular displacement between the start position and the end position. Limiting the maximum range of angles the weighted component may rotate through in response to an individual trigger event to 180 degrees means that the weighted component will always rotate through the shortest route from the start position to the end position. This saves additional energy when moving the weighted component and increases the apparent responsiveness of the haptic feedback to the trigger event.

Optionally, the trigger event is an output from an application running on a multimedia entertainment system. In this way, a user will experience the controller physically responding to an event in the application, enhancing the experience of controlling the application and multimedia entertainment system. The output from the application will vary depending on the application running on the system, some possible examples for illustration include "car turning left", "character walking with limp", "raising shield".

Optionally, the controller is configured to hold the weighted component at the end position until a second trigger event.

Holding the weighted component after the first trigger event until a second trigger event saves energy and is particularly suitable for some types of haptic feedback (such as direction leaning sensations). The second trigger event may be the same type of trigger event as the first trigger event or may be a different type of trigger event to the first trigger event. An example of where the first trigger event is different to the second trigger event is where the first trigger event is a virtual event of "car turning left" in the application, and the second trigger event is a real event of "controller rotated 30 degrees clockwise".

Optionally, the controller is configured to hold the weighted component at the end position for at least 0.5 seconds after rotating the weighted component.

In this way, rotation of the weighted component is prevented from vibrating the controller.

Optionally, the controller is configured to rotate the weighted component in response to a change of orientation of the controller.

This means the haptic feedback of the controller can be adjusted based on the orientation of the controller. In such an implementation, the change of orientation of the controller can be considered a trigger event as described above.

Optionally, the controller is configured to rotate the weighted component to counteract the change of orientation of the controller.

In this way, the weighted component may remain stationary relative to gravity, until a trigger event occurs that prompts the controller to rotate the weighted relative to gravity. The weighted component being rotated to counteract the change of orientation of the controller means that the weighted component is rotated such that the resultant torque due to gravity acting on the controller, in the plane of rotation of the weighted component, is reduced relative to if the weighted component was not rotated. The weighted component may be rotated to totally counteract the change of orientation of the controller, such that there is substantially no resultant torque due to gravity acting on the controller in the plane of rotation of the weighted component. For example, when the controller is rotated 30 degrees clockwise, the weighted component is rotated 30 degrees anticlockwise. This makes the controller more comfortable for the user to hold at any orientation, and means that the weighted component moves to the correct end position in order to provide the desired directional haptic feedback.

Optionally, the end position of the weighted component is determined using the orientation of the controller.

This is particularly useful when haptic feedback is intended to provide directional feedback relative to a reference point other than the controller, as it ensures the directional feedback will be output correctly regardless of the orientation of the controller. If the orientation of the controller is not considered when rotating the weighted component, then the direction of the resulting feedback may be incorrect (e.g. inconsistent with the trigger event) and distract the user. In practice, this may result in the end position of the weighted component being different for the same trigger event depending on the orientation of the controller. This can be implemented in variety of ways, for example by determining the end position (and optionally the start position) of the weighted component relative to gravity rather than an axis of the controller.

Optionally, the controller further comprises an orientation sensor. The orientation sensor is configured to determine the orientation of the controller. For example, relative to the multimedia entertainment system or gravity. When the controller does not comprise an orientation sensor, the orientation of the controller may still be determined, for example using an external camera in communication with the multimedia entertainment system.

Optionally, the controller further comprises a processor configured to receive an input and further configured to determine an output rotation of the weighted component based at least in part on the input. This may reduce the time between the trigger event and movement of the weighted component in response to the trigger event. Alternatively, the output rotation of the weighted component may be determined by the multimedia entertainment system, a server or cloud service and communicated to the controller. The input may be the trigger event, at least one property of the trigger event.

Optionally, the input comprises information relating to one or more of the trigger event, orientation of the controller, position of the controller and speed of movement of the controller.

The information relating to the controller (e.g. the orientation of the controller) may refer to information relating the controller body itself (e.g. the orientation of the controller body) and/or information relating to the weighted component of the controller (e.g. the orientation of the weighted component).

Optionally, the controller further comprises one or more motors configured to selectively rotate the weighted component, and wherein the processor is configured to send the determined output rotation to the one or more motors for actuation.

Using motor(s) to selectively rotate the weighted component has been found to be effective and energy efficient at providing directional haptic feedback, particularly when the weighted component is rotated towards and held at an end position for an extended period of time (e.g. longer than 0.5 seconds).

When the weighted component is rapidly moved in relation to the controller, the rapid acceleration of the component can cause a resultant force or torque experienced by the user. Particularly, a sudden change in direction of movement of the weighted component may cause a noticeable resultant force or torque felt by the user. Therefore, the weighted component may be rapidly accelerated and decelerated (either in one direction or opposing directions) to generate such a tactile resulting force or torque for the user holding the controller. Such a tactile force may be experienced for example when the weighted component is brought to a stop from movement. In some examples, the movement of the weighted component may be effected in a way which does not cause such a tactile force due to acceleration/deceleration (but which still results in a shift of the centre of mass.

The movement of the weighted component may be described as uniform—that is to say that the absolute acceleration may be kept at a minimum to reduce the resultant force or torque. In some examples, to avoid the resultant force when a sudden change in direction is effected, the controller may be configured to pause between movements in which the weighted component is moved in opposing directions. Such a pause may last 1 second or more, for example. The movement may also be damped—that is, the motion may be dovetailed near the start and stop points of motion so that the weighted component gradually accelerates from zero and gradually decelerates to zero at the end of its motion.

Optionally, the controller is configured to slowly rotate the weighted component from the start position to the end position. That is to say, the weighted component may be gradually and continuously moved so as to not cause a resultant force or torque on the user due to acceleration of the weighted component. In some examples the average velocity of the motion itself may be of a low speed, for example at a rate of less than 1 degree per second. In this way, the centre of mass of the controller is slowly shifted in response to the trigger event. This gradual change in the centre of mass is continuously perceived by a user and is notably distinct from faster movements of the weighted component, where the user is more likely to perceive a change of momentum of the controller rather than a continuous perception of the location of the centre of mass of the controller.

Optionally, rotation of the weighted component is operated at a rotation speed, and the rotation speed is determined at least in part by the trigger event. The rotation speed may be constant throughout the rotation of the weighted component from the start position to the end position, or the rotation speed may vary as the weighted component rotates. Where the rotation of the weighted component is effected based at least in part on a trigger event, the acceleration of the weighted component may be determined by the trigger event, or data associated with the trigger event. For example, input from a game or entertainment system may determine the direction and/or rate at which the weighted component is rotated through its degrees of freedom. Alternatively, the game or entertainment system may provide a desired force to be applied to the user by the haptic module or controller, and the haptic module or controller may receive that target force as input and calculate speed and/or acceleration of the weighted component required to achieve that target force. This may be done by a processor on-board the haptic module or controller, and any calculated motion of the weighted component may be stored on a memory on-board the haptic module or controller for repeat usage.

Optionally, the rotation speed is determined at least in part by a preset user preference.

The weighted component can be rotated at different speeds in order to provide different haptic feedback according to different trigger events. For example, if a gentle leaning haptic feedback sensation is desired in response to a first trigger event (e.g. corresponding to an application where a leaf falls from a tree) then the weighted component will have a lower rotation speed than when a sudden directional impact haptic feedback sensation is desired in response to a second trigger event (e.g., corresponding to an application where a race car is in a collision). Determining the rotation speed may also take into account other factors such as the movement of the controller, orientation of the controller and the preferences of the user. For example, some users may limit the minimum rotation speed and/or the maximum rotation speed of the weighted component to better suit their current preferences. In a specific example, a user operating the controller on public transportation might be more likely to limit the strength of any jerking sensation provided by the controller and so will set a lower maximum rotation speed than a user operating the controller in their own home. These user preferences can be preset for specific applications controlled by the controller, or globally for all uses of the controller.

Optionally, the weighted component comprises a first mass on an arm rotatable relative to a pivot point. Preferably, the pivot point is arranged at a geometrically central position of the controller, such that the first mass rotates about the geometrically central position of the controller.

Optionally, the first mass is located at a first end of the arm and the pivot point is located at a second end of the arm opposing the first end. In this way, a moment provided by the weighted component is maximised for a given mass and volume, increasing the limit of the strength of haptic feedback events that may be provided by the weighted component.

In some examples, the weighted component may be configured to rotate within a single plane. That is, the motion may be in one angular dimension. In other examples, the weighted component may move or rotate between multiple planes, and its motion may be described by two angular dimensions. For example the weighted component may be operated to describe a circular motion such that the volume contained by the weighted component and its connection to the controller describes a cone.

Optionally, the weighted component is rotatable to shift the centre of mass of the controller along a longitudinal axis of the controller. In this way, the weighted component can be rotated to provide haptic feedback in a plane of the longitudinal axis of the controller. For example, a leaning sensation or impact sensation in a direction along the plane of the weighted component and the longitudinal axis of the controller.

Optionally, the controller further comprises a first hand grip and a second hand grip, the first and second hand grips arranged for a user to hold the controller, wherein the longitudinal axis is defined between the first and second hand grips.

In this way, rotating the weighted component can provide directional haptic feedback towards or away from the hand grips. For example, rotating the weighted component towards the first hand grip will shift the centre of mass of the controller towards the first hand grip and cause the controller to lean more towards the first hand grip.

Alternatively, the controller further comprises only a single hand grip. In this way, the controller provides the user a greater degree of freedom of movement than a controller with a plurality of hand grips while the weighted component still provides directional haptic feedback relative to the hand grip. Preferably, the longitudinal axis of the controller runs through the single hand grip.

Optionally, the controller may include a plurality of weighted components, where the controller and the weighted components are configured in the same manner described above, and the weighted components are independently rotatable from each other. Including a plurality of independently rotatable weighted components increase the variety of haptic feedback possible for the controller to provide. The plurality of weighted components may each rotate through the same plane as each other. Alternatively, some or all of the plurality of weighted components may have different planes of rotation.

Preferably, the plurality of weighted components are evenly distributed throughout the controller.

In a second aspect, there is provided a haptic module for a controller for a multimedia entertainment system, the haptic module comprising a weighted component, wherein the weighted component is rotationally moveable relative to a connected element and configured to rotationally move from a start position to an end position to shift the centre of mass of the haptic module in response to a trigger event, wherein the weighted component stops moving at the end position.

The haptic module may be configured in a similar manner to the controller of the first aspect described above. For example, the connected element referenced in the second aspect may be the controller of the first aspect, and the trigger event of the second aspect may be the trigger event referenced in the first aspect. However, it will be appreciated that the haptic element may be used with (and connected to) other devices such as headphones or virtual reality headsets, or other types of peripherals. It will also be recognised that the specific nature of the connected element and the trigger event may vary depending on how the haptic module is implemented. The weighted component may be connected directly to the connected element, or the weighted component may be comprised within the haptic module which is itself directly connected to the connected element.

The haptic module may be configured similarly to the controller of the first aspect, for example such that the weighted component of the second aspect corresponds to the weighted component of the first aspect. The effects and advantages discussed above in relation to the first aspect are also provided by the corresponding implementations of the second aspect.

Specifically, this may mean that the start position is different to the end position.

Optionally, the haptic element is configured to rotate the weighted component between 0 and 360 degrees relative to an axis of the connected element in response to the trigger event.

Optionally, the haptic element is configured to rotate the weighted component between 0 and 180 degrees relative to an axis of the connected element in response to the trigger event.

Optionally, the trigger event is an output from an application running on a multimedia entertainment system.

Optionally, the haptic module is configured to hold the weighted component at the end position until a second trigger event.

Optionally, the haptic module is configured to hold the weighted component at the end position for at least 0.5 seconds after rotating the weighted component.

Optionally, the haptic module is configured to rotate the weighted component in response to a change of orientation of the haptic module.

Optionally, the haptic module is configured to rotate the weighted component to counteract the change of orientation of the haptic module.

Optionally, the end position of the weighted component is determined using the orientation of the haptic module.

Optionally, the haptic module further comprises an orientation sensor.

Optionally, the haptic module further comprises a processor configured to receive an input and further configured to determine an output rotation of the weighted component based at least in part on the input.

Optionally, the input comprises information relating to one or more of the trigger event, orientation of the haptic module, position of the haptic module and speed of movement of the haptic module.

Optionally, the haptic module further comprises one or more motors configured to selectively rotate the weighted component, and wherein the processor is configured to send the determined output rotation to the one or more motors for actuation.

Optionally, the haptic module is configured to slowly rotate the weighted component from the start position to the end position.

Optionally, rotation of the weighted component is operated at a rotation speed, and the rotation speed is determined at least in part by the trigger event.

Optionally, the rotation speed is determined at least in part by a preset user preference.

Optionally, the weighted component comprises a first mass on an arm rotatable relative to a pivot point. Preferably, the pivot point is arranged at a central position of the haptic module, such that the first mass rotates about the central position of the haptic module.

Optionally, the first mass is located at a first end of the arm and the pivot point is located at a second end of the arm opposing the first end.

Optionally, the weighted component is rotatable to shift the centre of mass of the haptic module along a longitudinal axis of the haptic module.

Optionally, the haptic module may include a plurality of weighted components, where the haptic module and the weighted components are configured in the same manner described above, and the weighted components are independently rotatable from each other. Preferably, the plurality of weighted components are evenly distributed throughout the haptic module.

Additional aspects, advantages, features and objects of the present invention would be made apparent from the drawings and the detailed description of the illustrative embodiments construed in conjunction with the appended claims that follow.

It will be appreciated that features of the present invention are susceptible to being combined in various combinations without departing from the scope of the present disclosure as defined by the appended claims.

BRIEF DESCRIPTION OF DRAWINGS

Embodiments of the present invention are described below, by way of example only, with reference to the accompanying drawings, in which.

DETAILED DESCRIPTION

Figures 1A, 1B:
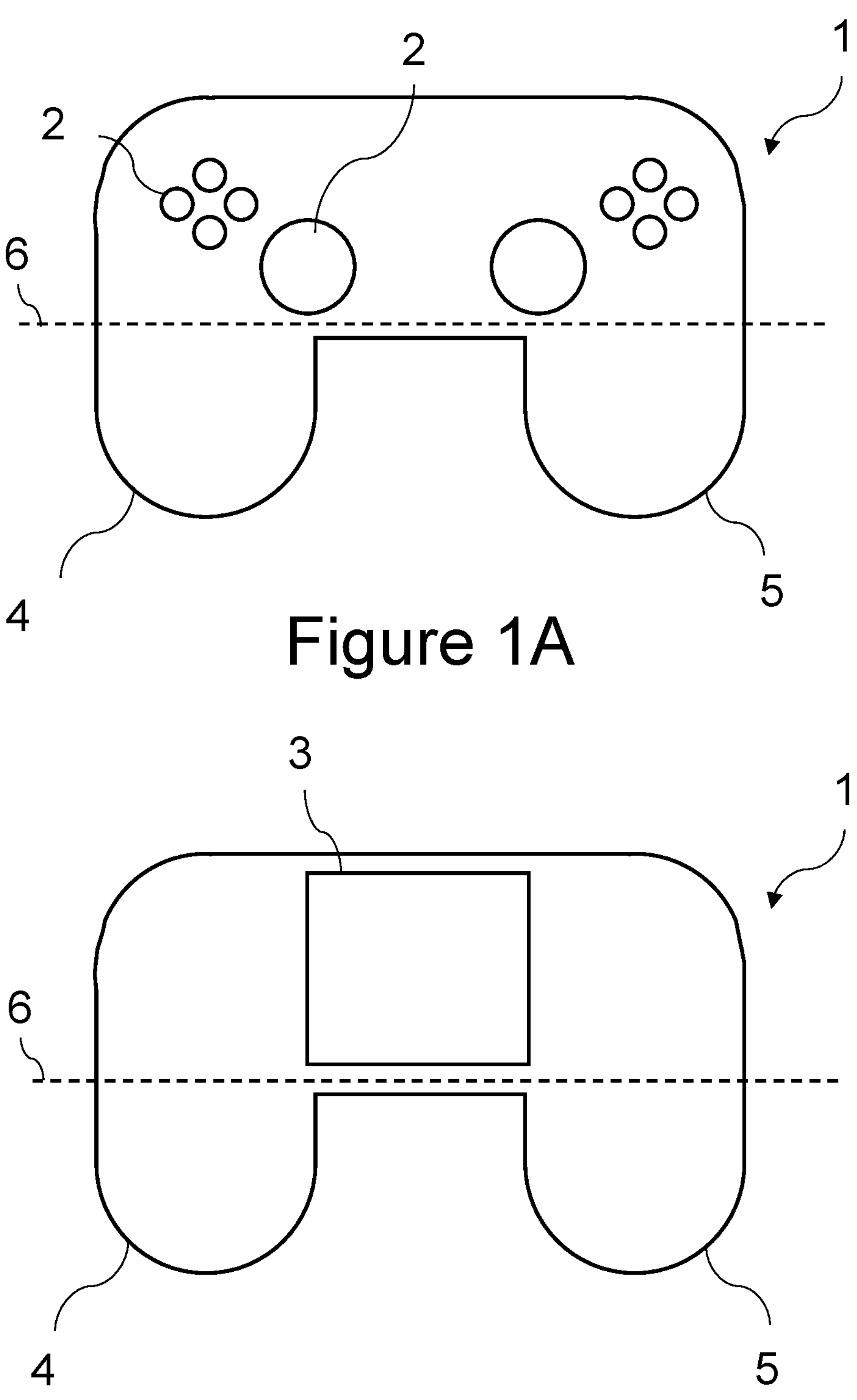
FIGS. 1A and 1B show a plan view of a controller for a multimedia entertainment system.

Referring to FIGS. 1A and 1B, a controller 1 for a multimedia entertainment system is shown in a plan view. The controller 1 comprises opposing first and second hand grips 4, 5 for a user to hold the controller 1, with a longitudinal axis of the controller 6 (also referred to as the controller axis 6) defined between the first grip 4 and the second grip 5. Input elements 2 such as buttons and analogue sticks are provided on the exterior of the controller 1 as shown in FIG. 1A, and a haptic module 3 of the controller 1 is shown in the view of the controller 1 in FIG. 1B. The haptic module 3 is not used for input from a user, and so it is preferred that the haptic module 3 is provided within the controller 1 body to shield moving parts of the haptic module 3.

The haptic module 3 is configured to provide haptic feedback to a user of the controller and comprises a weighted component 10 connected to the controller 1, where the weighted component 10 is rotationally moveable relative to the controller 1. An example of the haptic module 3 comprising the weighted component 10 is shown in FIGS. 2A, 3A, 4A and 5A. The weighted component 10 is connected to the controller 1 such that rotating the weighted component 10 also shifts the centre of mass 7 of the controller 1. This is described in further detail below.

Whilst the description of the haptic module 3 is given, for ease of reference, in the context of a controller 1 as shown in FIG. 1A, it will be apparent that the haptic module 4 may be comprised in other devices in order to provide enhanced haptic feedback to these devices. For example, the haptic module 3 may be connected to or integrated in other peripherals for multimedia entertainment systems, such as headphones or a virtual reality headset. Similarly, the controller 1 described in detail herein is just one example of a controller for which the haptic module 3 is suitable, and the haptic module 3 is suitable for use with other controllers which are not described here in detail—such controllers may have different configurations and placement of handles and the like. The haptic module 3 is not limited to use with any particularly shaped controller. For example, the haptic module 3 may be comprised in a controller with only a single hand grip, configured to be held and operated by only one hand of a user.

The exemplary controller 1 of FIG. 1A is configured to rotate the weighted component 10 and the way the weighted component 10 is moved (and halted) can be varied to control the haptic feedback provided to the user.

For example, the weighted component 10 may have a neutral position for any given orientation of the controller 1 where, when the weighted component 10 is in this neutral position, there is no torque on the controller 1 held by the user. For a given orientation of the controller 1, when the weighted component 10 is moved away from the original neutral position this alters the weight distribution of the controller 1, moving the centre of mass 7 of the controller 1 and causing gravity to produce a torque produce a torque on the controller that can be felt by the user. The produced torque will cause the user to feel the controller 1 leaning in their hands, as if it is urging the user's hands in a particular direction. Keeping the weighted component 10 away from the original neutral position will maintain the leaning effect experienced by the user unless they rotate the controller 1 itself into a second neutral position (i.e. a position where the new centre of mass 7 of the controller 1 is again aligned with gravity and there is no torque on the controller 1). In addition, rotation of the weighted component 10 can be rapidly accelerated and decelerated to simulate a directional impact effect that can be felt by the user. The weighted component 10 is rotated in response to a trigger event, and the nature of the movement of the weighted component 10 will vary depending on the nature of the corresponding trigger event.

Existing haptic modules for controllers, such as vibration engines, are not intended to alter the weight distribution of a controller (e.g. to change a controller from feeling balanced to making the controller feel heavier on one side). In fact, due to the high frequencies and low amplitudes these vibration engines oscillate at to achieve their intended "rumble" effect, they cannot be used to alter the perceived weight distribution of a controller and have a negligible effect on the overall balance of a controller. Existing controllers using haptic modules often distribute several haptic modules around the controller for the very purpose of providing haptic feedback without noticeably changing the feel of the balance of the controller, as the effect any individual haptic module can have on the overall weight distribution is therefore limited. Particularly as the oscillating masses used in these modules are biased towards a balanced position.

Specific examples of a controller 1 with a haptic module 3 according to the present invention will now be described to illustrate the differences and advantages of the invention over known controllers.

Figure 2A:
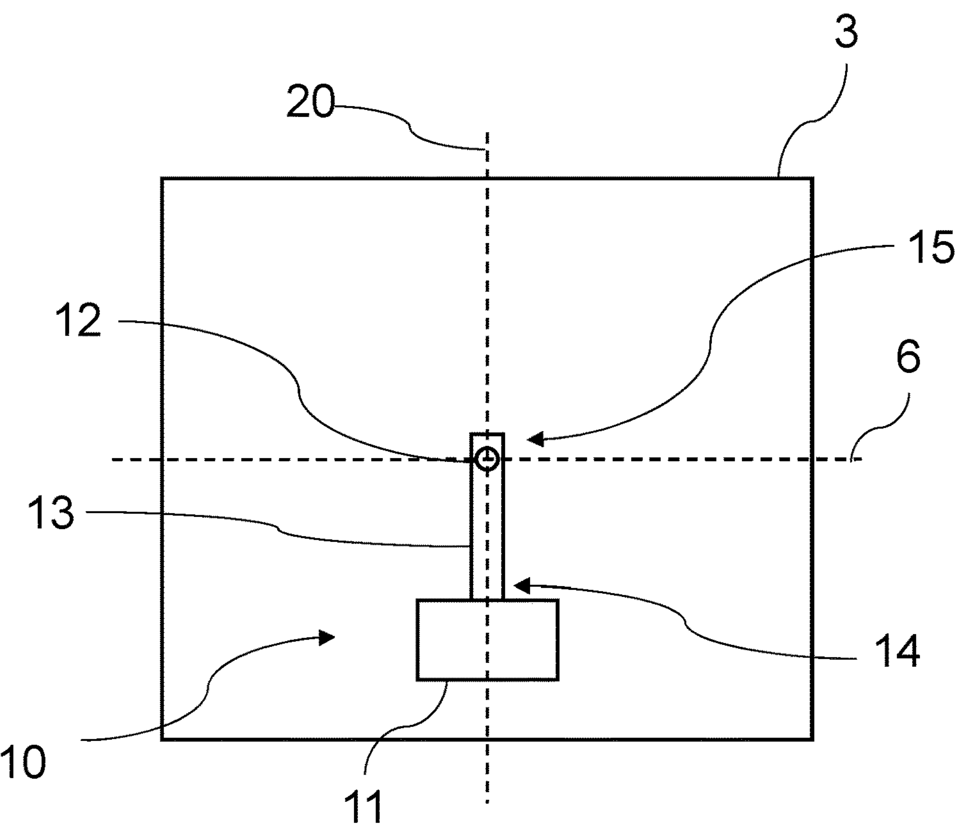
FIG. 2A shows a haptic module of a controller in a start position.
Figure 3A:
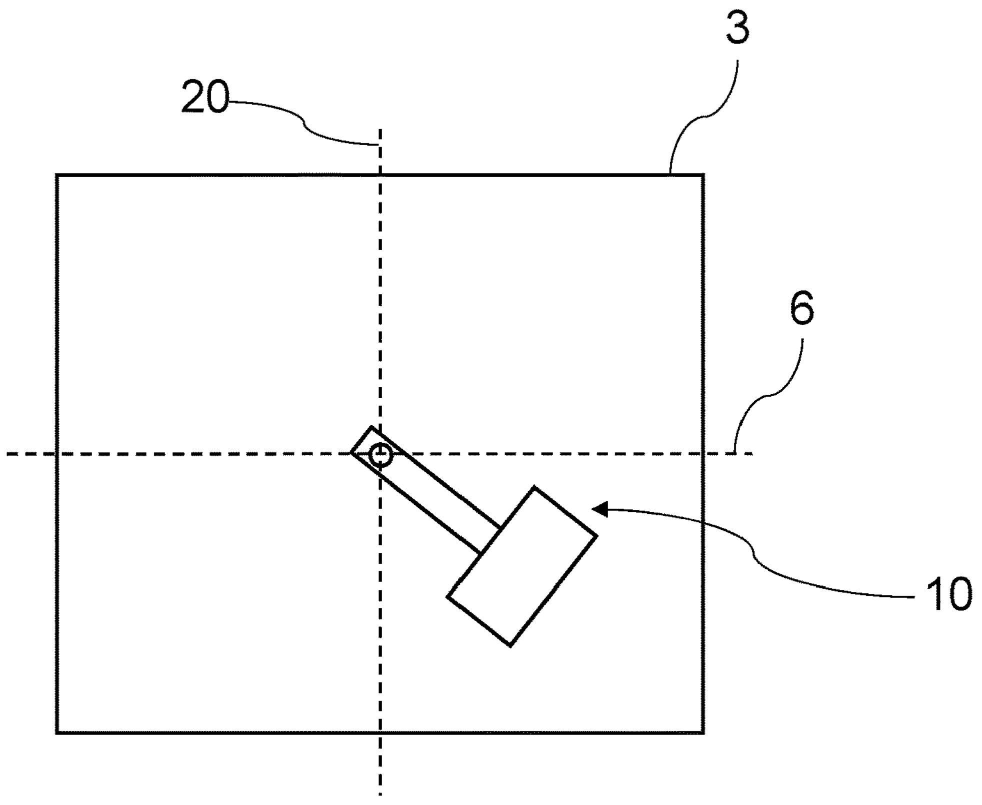
FIG. 3A shows the haptic module of the controller in an end position.

FIGS. 2A and 3A show detailed views of a haptic module 3 for the controller 1 of FIGS. 1A and 1B. The haptic module 3 comprises a weighted component 10 rotatably connected to the controller (not shown). In this example, the weighted component 10 comprises a first mass 11 on an arm 13 rotatable relative to a pivot point 12, where the weighted component 10 is connected to the controller at the pivot point 12. The first mass 11 is located at a first end 14 of the arm 13, with the pivot point 12 being located at a second end 15 of the arm 13 opposing the first end 14. FIG. 2A shows the weighted component 10 in a start position and FIG. 3A shows the weighted component 10 in an end position, after the weighted component has been rotated relative to the controller 1. In this example, when the weighted component 10 is in the start position it lies along the vertical axis 10 running through the pivot point 12 and parallel to gravity, and when the weighted component 10 is in the end position it is located away from the vertical axis 10.

Figure 2B:
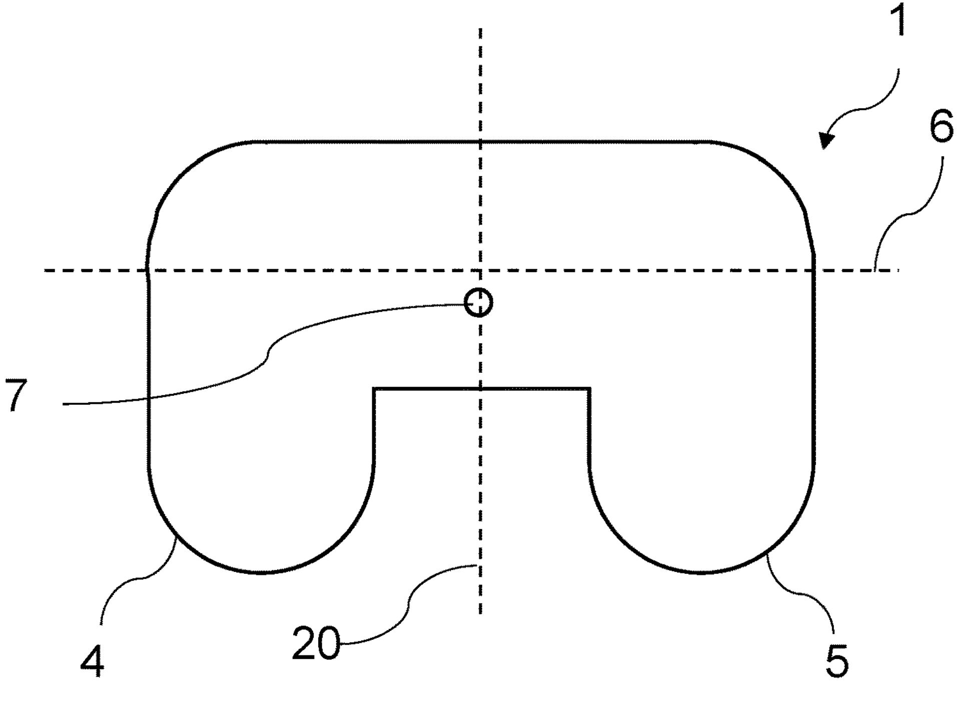
FIG. 2B shows a plan view of the controller illustrating the centre of mass of the controller.
Figure 3B:
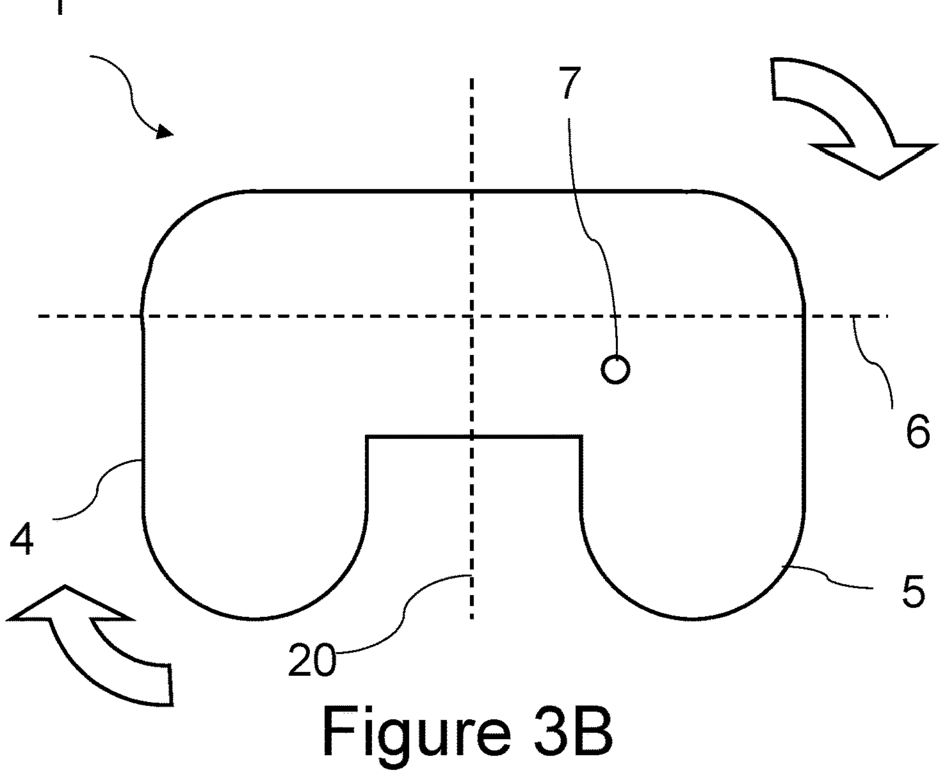
FIG. 3B shows a plan view of the controller illustrating the centre of mass of the controller.

FIGS. 2B and 3B show a plan view of a controller 1 comprising the weighted component 10 of FIGS. 2A and 3A. FIGS. 2B and 3B correspond to FIGS. 2A and 3A respectively such that FIG. 2B illustrates the location of the centre of mass 7 of the controller 1 when the weighted component 10 is in the start position, and FIG. 3B illustrates the location of the centre of mass 7 of the controller 1 when the weighted component 10 is in the end position. The controller 1 is configured to rotate the weighted component 10 from the start position to the end position, thereby moving the centre of mass 7 of the controller 10. The start position and the end position of the weighted component 10 are not fixed for a controller 1 and can each be adjusted between weighted component 10 movements. For example, the weighted component 10 may rotate from a first start position to a first end position, stop rotating at the first end position, and then rotate again (in the same direction or a different direction) from the first end position (i.e. a second start position) to a second end position.

To provide the most effective haptic feedback, the controller 10 is configured to rotate the weighted component 10 (from a start position to an end position) in response to a trigger event, with an output rotation of the weighted component 10 determined based at least in part on the trigger event. This means the controller 1 is configured to shift the centre of mass 7 of the controller 1 in response to a trigger event.

The trigger event may be a virtual event that occurs in an application running on the multimedia entertainment system; or the trigger event may be a real event such as the actuation of an input element 2 of the controller 1. The virtual event can also be considered an output from the application. The output from the application is used as (part of) an input for the controller 1 (either directly or indirectly) and is used to determine an output rotation of the weighted component 10. For example, the trigger event may be a virtual character swinging a sword in the application running on the system, and so the controller 1 is configured to rotate the weighted component 10 in response to the sword swinging—adjusting the weight distribution of the controller 1 to simulate the weight of the sword moving with respect to the virtual character.

The controller 1 may determine the output rotation of the weighted component 10 itself, based at least in part on the input, using a processor (not shown) of the controller 1. Alternatively, the output rotation can be determined by the multimedia entertainment system the controller 1 is used with, or by a server or cloud service, and transmitted to the controller 1. The input used to determine the output rotation includes information relating to the trigger event and/or the controller 1. The weighted component 10 can be rotated using a variety of mechanisms, including using one or more motors (not shown) comprised in the controller 1 and configured to receive the determined output rotation and selectively rotate the weighted component 10 based on the output rotation.

When the weighted component 10 is away from the vertical axis 20, such that the centre of mass 7 of the controller 1 is also away from the vertical axis 20, a user holding the controller 1 will feel the controller 1 leaning in the direction of the centre of mass 7 as the controller 1 attempts to rotate to align the centre of mass 7 with the vertical axis 20 again. This is shown in FIG. 3B, where the controller 1 attempts to rotate clockwise as a greater proportion of the mass of the controller 1 is closer to the second grip 5 than is close to the first grip 4, and so a user holding the controller 1 will feel the controller "leaning" towards the second hand grip 5. The controller 1 will feel heavier near the second hand grip 5 than it does near the first hand grip 4. Preferably, when a leaning sensation of the controller 1 is desired, the weighted component 10 is held at the end position for an extended period (e.g. at least 0.5 seconds) to ensure a user holding the controller 1 notices the change in weight distribution and leaning sensation provided by the controller 1. However, the skilled person will appreciate that the weighted component 10 may be held in the end position for any given period of time and this will vary depending on the trigger event that led to the rotation of the weighted component 10.

The leaning sensation of the controller 1 discussed above can be used to enhance a user's experience of using the controller 1 in a range of ways. In one example, when the controller 1 is used with a video game application that includes car racing, the weighted component 10 can be configured to rotate when the car is turning (i.e. a trigger event is the car turning). In this virtual car racing example, the weighted component 10 may be configured to move in the direction the car is turning (i.e. the virtual car turns to the left and the weighted component 10 rotates to move the centre of mass 7 of the controller towards the left side of the controller 1) to simulate the steering wheel of the virtual car. Alternatively, the controller 1 may be configured to move the weighted component 10 in the opposite direction to the direction the car is turning, to simulate the G-force that would be experienced by the driver of the virtual car. In another example, when the controller 1 is used with a video game application that includes controlling a walking character, a trigger event is the character taking a step and the weighted component 10 may be configured to rotate towards one side of the controller 1 in time with the to simulate that character limping as they walk in the video game.

As well as providing a leaning sensation, the controller 1 can be configured to rotate the weighted component 10 to provide an impact effect, imparting a directional impact sensation to a user holding the controller 1. When holding the controller 1, the impact effect will feel to a user as if the controller 1 is suddenly jerked in a particular direction. This impact sensation is provided by rotating the weighted component 10 and rapidly decelerating the weighted component 10 (i.e. slowing and/or stopping the rotation) to transfer the momentum acquired the moving weighted component 10 to the connected controller 1. The nature of the impact effect can be highly customised by controlling, for example, the speed at which the weighted component 10 is rotating, the mass of the weighted component 10, the rate of deceleration of the weighted component 10 and the angular position at which the weighted component 10 is slowed. Rotation of the weighted component 10 may also be quickly reversed to limit the impact effect. Using FIG. 3A as an example illustrating the weighted component 10 in the end position, when the weighted component 10 has been rotating anticlockwise and rapidly decelerated to stop moving at the illustrated end position, the momentum of the weighted component 10 will be transferred to the controller 1 and provide an impact effect in the direction of the upper right corner of FIG. 3A. Using a similar example to that described above, where the controller 1 is used with a car racing video game application, a trigger event corresponding to an impact sensation may be the car crashing (with another car or a barrier etc), such that the weighted component 1 is rapidly accelerated and decelerated between the start and end positions, causing the controller 1 to jerk in the direction of the crash and simulate the car's loss of momentum.

The controller 1 may also be configured to rotate the weighted component 10 in response to movement of the controller 1, for example in response to a change of orientation of the controller 1. In these embodiments, the movement of the controller 1 itself may be considered a trigger event as described above, though it will be appreciated that the movement of the controller 1 can be a trigger event in addition to other types of trigger events (both virtual and real).

Figure 4A:
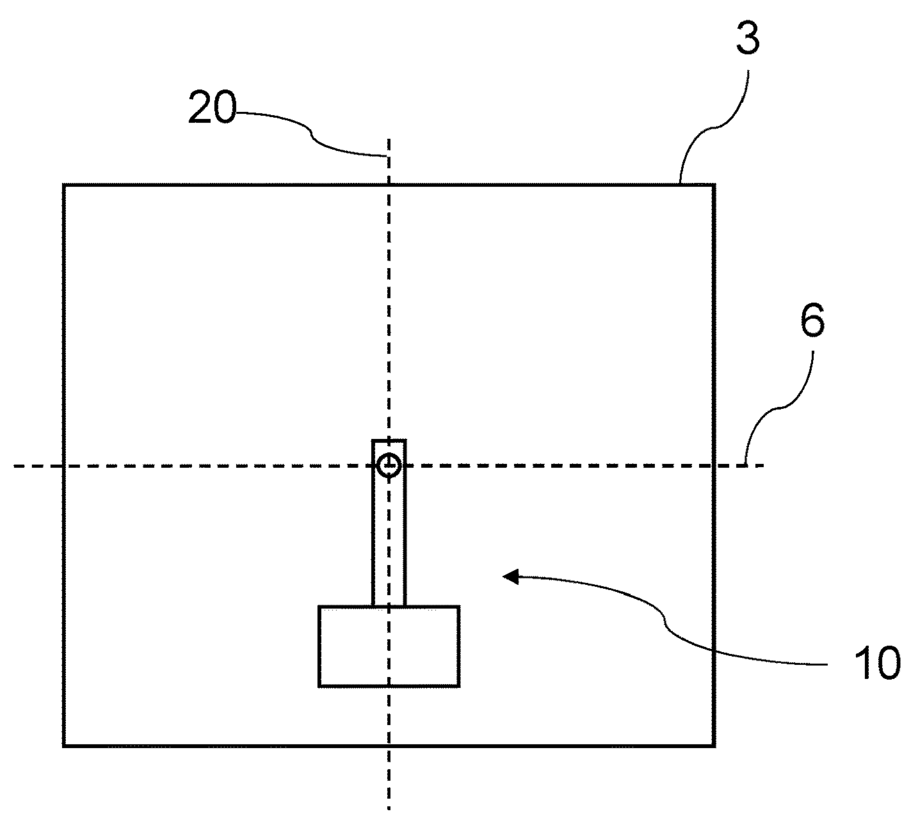
FIG. 4A shows the haptic module of the controller in a start position.
Figure 4B:
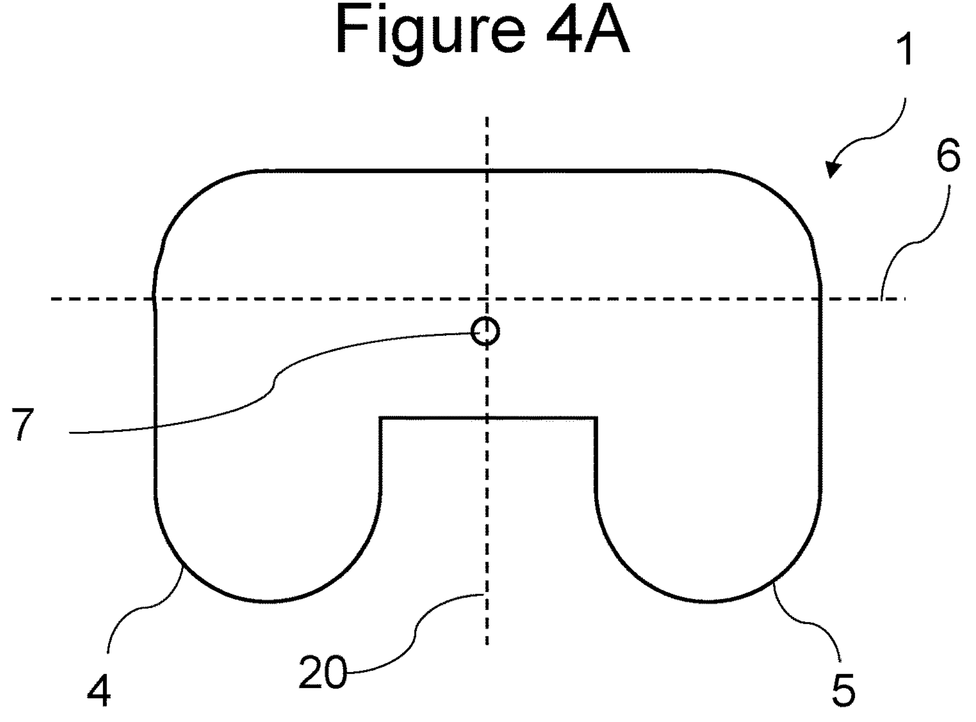
FIG. 4B shows a plan view of the controller illustrating the centre of mass of the controller.
Figure 5A:
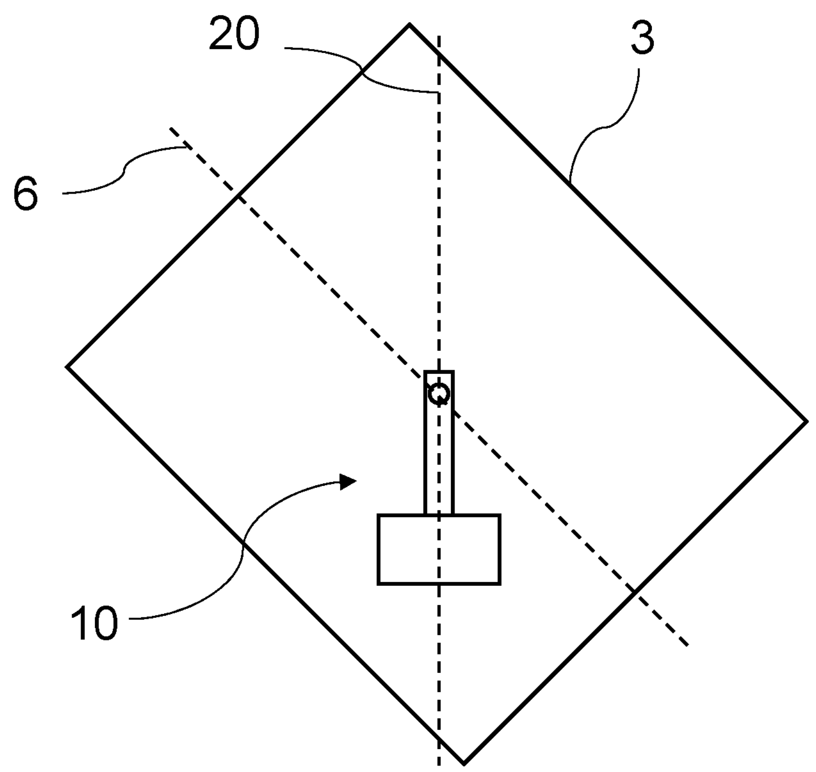
FIG. 5A shows the haptic module of the controller in an end position when the controller has been rotated.
Figure 5B:
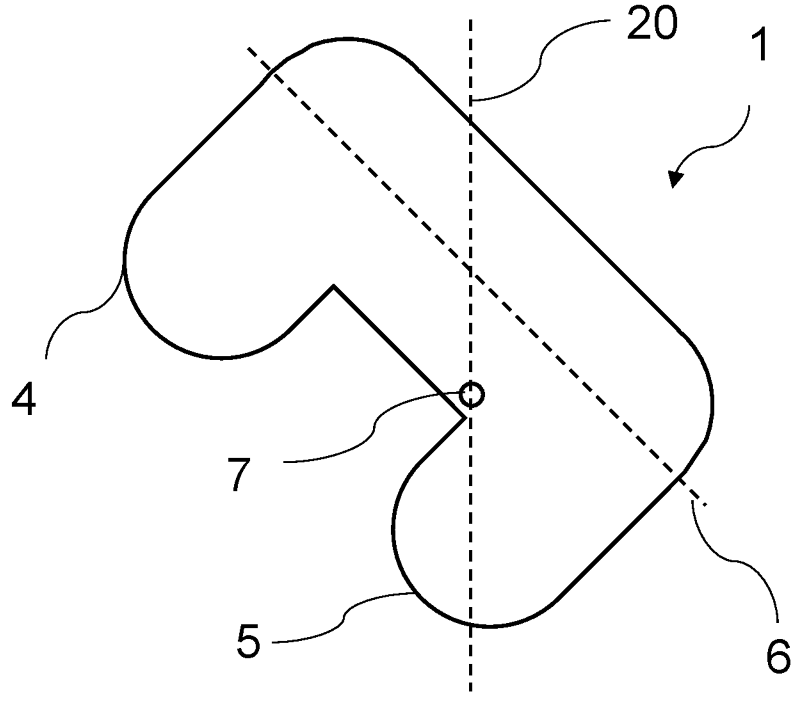
FIG. 5B shows a plan view of the rotated controller illustrating the centre of mass of the controller.

An example of the trigger event being a change of orientation of a controller 1 is shown in FIGS. 4A, 4B, 5A, and 5B, where FIGS. 4A and 4B show the controller 1 (and in particular the haptic module 3 of the controller 1) in a first orientation and FIGS. 5A and 5B show the same controller 1 (and the same haptic module 3) in a second orientation. In FIGS. 4A and 4B, the controller 1 is held horizontally with the controller axis 6 perpendicular to the vertical axis 20 of gravity and the centre of mass 7 of the controller 1 centrally located along the length of the controller axis 6. This first orientation is considered the default orientation and the controller 1 will feel balanced when held by user. In FIGS. 5A and 5B, the controller 1 has been rotated to the second orientation and the controller axis 6 is no longer perpendicular to the vertical axis 20. However, in response to this trigger event of the controller 1 rotating, the controller 1 has rotated the weighted component 10 to counteract the change of orientation of the controller 1 such that the centre of mass 7 of the controller 1 remains aligned with the vertical axis 6. This means that the controller 1 will continue to feel balanced to a user holding it, and the user holding the controller 1 in the second orientation will not feel the controller 1 leaning away from the vertical axis 20. This makes the controller 1 more comfortable for the user to hold in an orientation that is not the default orientation.

The movement and orientation of the controller 1 can be detected through a variety of mechanisms. For example, the controller 1 may comprise an orientation sensor and/or an accelerometer. The movement of the controller 1 can also be detected using sensors of the multimedia entertainment system used with the controller 1, or other peripherals in communication with the system and/or controller 1.

The current state of the controller 1 (i.e. the movement and orientation of the controller 1) can also be used to determine output rotations of the weighted component 10 other than moving the weighted component 10 directly in response to movement of the controller 1. One technique is to ensure the actual distribution of weight of the controller 1 in response to a trigger event produces the haptic feedback intended for that trigger event. This is achieved by moving the haptic module(s) 3 such as the weighted component 10 and/or adjusting the weight distribution of the controller 1 with respect to a reference point other than that of the controller 1, for example with respect to the vertical axis 20 of gravity.

When preparing haptic feedback in response to a trigger event in an application, the developers of the application will expect the controller 1 is held by a user in a given state such as the default orientation discussed above. This means that the developers can create bespoke haptic feedback for the application that dramatically improve the experience of controlling the application (e.g. playing a video game application). However, the controller 1 can be held at many different angles and positions other than the expected state which may lead to the weight distribution being altered (in response to trigger events) in a manner that distracts the user, rather than enhancing their experience. An example is described to illustrate this; a controller 1 is used to control an application displayed on a monitor and there is a trigger event with corresponding haptic feedback intended to impart a leftward leaning sensation to controller 1 (relative to the vertical axis). When the controller 1 is held in the default orientation shown in FIG. 4B, the output rotation of the weighted component 10 in response to the trigger event is to rotate the weighted component 10 towards the first hand grip 4 and hold it at that end position. This shifts the centre of mass 7 of the controller 1 towards the left of the vertical axis 20 and causes the controller 1 to lean to the left of the vertical axis 20. However, when the same controller 1 is held such that the controller axis 6 is parallel to the vertical axis 20 (and the arm 13 of the weighted component 10 is perpendicular to the vertical axis 20), if the weighted component 10 is rotated in the same way (towards the first grip 4) then it will shift the centre of mass 7 of the controller 1 to be in line with the vertical axis 20 and the controller 1 will not lean to either side. By taking into account the current state of the controller 1 (in particular the current orientation of the controller 1) during the trigger event, the end position of the weighted component 10 can be determined with respect to the vertical axis 20 and the weighted component 10 can be rotated to and held at this end position, producing the intended leaning sensation regardless of the controller 1 orientation.

Though the above exampled discusses haptic feedback in response to a trigger event in an application, the skilled person will appreciate that this also applies to any haptic feedback by a controller 1 for a multimedia entertainment system.

Having described aspects of the disclosure in detail, it will be apparent that modifications and variations are possible without departing from the scope of aspects of the disclosure as defined in the appended claims. As various changes could be made in the above methods and products without departing from the scope of aspects of the disclosure, it is intended that all matter contained in the above description and shown in the accompanying drawings shall be interpreted as illustrative and not in a limiting sense.

The invention claimed is:

1. A controller for a multimedia entertainment system, the controller comprising:
- a weighted component connected to the controller, wherein the weighted component is rotationally movable relative to the controller;
- one or more motors configured to selectively rotate the weighted component relative to the controller; and
- control circuitry configured to control the one or more motors, wherein the controller is configured to receive an output rotation and a rotation speed based on a trigger event, and wherein the control circuitry is configured to:
  - cause the one or more motors to rotate the weighted component from a start position to an end position according to the output rotation and at the rotation speed to shift the center of mass of the controller in response to a trigger event; and
  - cause the one or more motors to hold the weighted component at the end position.

2. The controller of claim 1, wherein the start position is different to the end position.

3. The controller of claim 2, wherein the one or more motors are configured to rotate the weighted component between 0 and 180 degrees relative to an axis of the controller in response to the trigger event.

4. The controller of claim 1, wherein the one or more motors are configured to rotate the weighted component between 0 and 360 degrees relative to an axis of the controller in response to the trigger event.

5. The controller of claim 1, wherein the trigger event is an output from an application running on a multimedia entertainment system.

6. The controller of claim 1, wherein the one or more motors are configured to hold the weighted component at the end position until a second trigger event.

7. The controller of claim 1, wherein the one or more motors are configured to hold the weighted component at the end position for at least 0.5 seconds after rotating the weighted component.

8. The controller of claim 1, wherein the one or more motors are configured to rotate the weighted component in response to a change of orientation of the controller.

9. The controller of claim 8, wherein the one or more motors are configured to rotate the weighted component to counteract the change of orientation of the controller.

10. The controller of claim 1, wherein the end position of the weighted component is determined using an orientation of the controller.

11. The controller of claim 10, wherein the controller further comprises an orientation sensor.

12. The controller of claim 1, further comprising a processor configured to:
- receive an input; and
- determine an output rotation of the weighted component based at least in part on the input.

13. The controller of claim 12, wherein the input comprises information relating to one or more of the trigger event, an orientation of the controller, a position of the controller, or a speed of movement of the controller.

14. The controller of claim 12, further comprising one or more motors configured to selectively rotate the weighted component, wherein the processor is configured to send the output rotation to the one or more motors for actuation.

15. The controller of claim 1, wherein the configured to rotate the weighted component from the start position to the end position at a rate of less than 1 degree per second.

16. The controller of claim 1, wherein the weighted component comprises a first mass on an arm rotatable relative to a pivot point.

17. The controller of claim 16, wherein the first mass is located at a first end of the arm and the pivot point is located at a second end of the arm opposing the first end.

18. The controller of claim 1, wherein the weighted component is rotatable to shift the center of mass of the controller along a longitudinal axis of the controller.

19. The controller of claim 18, further comprising a first hand grip and a second hand grip, the first and second hand grips arranged for a user to hold the controller, wherein the longitudinal axis is defined between the first and second hand grips.

20. The method of claim 1, wherein the weight component is rotationally movable at least 360 degrees about an axis of the controller.

21. A controller for a multimedia entertainment system, the controller comprising:

a weighted component connected to the controller, wherein the weighted component is rotationally movable relative to the controller; and wherein the configured to rotate the weighted component from a start position to an end position to shift the center of mass of the controller in response to a trigger event, wherein the rotation speed is determined at least in part by a preset user preference.

22. A haptic module for a controller for a multimedia entertainment system, the haptic module comprising:

a weighted component, wherein the weighted component is rotationally moveable relative to a connected element;

one or more motors configured to selectively rotate the weighted component relative to the connected element; and control circuitry configured to control the one or more motors, wherein the configured to receive an output rotation and a rotation speed based on a trigger event, and wherein the control circuitry is configured to:

cause the one or more motors to rotationally move from a start position to an end position according to the output rotation and at the rotation speed to shift the center of mass of the haptic module in response to a trigger event, wherein the weighted component stops moving at the end position; and cause the one or more motors to hold the weighted component at the end position.

* * * * *